(12) United States Patent
Loddo

(10) Patent No.: US 7,316,420 B2
(45) Date of Patent: Jan. 8, 2008

(54) WATER-EXPELLING MUDGUARD FOR MOTOR VEHICLES

(76) Inventor: Francesco Loddo, Via Gramsci, 3, I-08036 Ortueri (IT)

(*) Notice: Subject to any disclaimer, the term of this patent is extended or adjusted under 35 U.S.C. 154(b) by 3 days.

(21) Appl. No.: 10/470,119

(22) PCT Filed: Jan. 14, 2002

(86) PCT No.: PCT/IT02/00014

§ 371 (c)(1),
(2), (4) Date: Dec. 22, 2003

(87) PCT Pub. No.: WO02/060743

PCT Pub. Date: Aug. 8, 2002

(65) Prior Publication Data

US 2004/0080185 A1 Apr. 29, 2004

(30) Foreign Application Priority Data

Jan. 29, 2001 (IT) .............................. NU01A0001

(51) Int. Cl.
B62D 25/18 (2006.01)

(52) U.S. Cl. ...................................... 280/851; 280/848

(58) Field of Classification Search ................ 280/847, 280/848, 851
See application file for complete search history.

(56) References Cited

U.S. PATENT DOCUMENTS

| 4,192,522 | A | * | 3/1980 | Morgan | 280/851 |
| 4,334,694 | A | * | 6/1982 | Iwanicki | 280/851 |
| 4,436,319 | A | * | 3/1984 | Clutter | 280/851 |
| 4,585,242 | A | * | 4/1986 | Sparks | 280/848 |
| 4,706,981 | A | * | 11/1987 | Dorwart | 280/851 |
| 4,858,941 | A | * | 8/1989 | Becker | 280/851 |
| 4,921,276 | A | * | 5/1990 | Morin | 280/848 |
| 5,100,177 | A | * | 3/1992 | Becker | 280/851 |
| 5,207,455 | A | * | 5/1993 | Gotz et al. | 280/848 |
| 5,277,444 | A | * | 1/1994 | Stropkay | 280/848 |
| 5,460,411 | A | * | 10/1995 | Becker | 280/851 |
| 5,564,750 | A | * | 10/1996 | Bajorek et al. | 280/851 |
| 6,799,782 | B2 | * | 10/2004 | Jain et al. | 280/848 |
| 6,851,717 | B1 | * | 2/2005 | Andersen | 280/847 |
| 2002/0109347 | A1 | * | 8/2002 | Sheppard | 280/851 |

* cited by examiner

Primary Examiner—Jeff Restifo
(74) Attorney, Agent, or Firm—Mayer & Williams PC; Mark D. Wieczorek, Esq.

(57) ABSTRACT

The invention relates to a mudguard for motor vehicles in general, comprising an external body (10) and an intrados (17) between which a curved cavity (16) extending from a front sector to a rear sector of the mudguard is defined, with reference to the wheel (2, 3) where it is mounted. The mudguard is further provided with a manifold (18) and a pair of deflectros (19, 20) which convey air into the cavity, so as to evacuate the water sprayed by the vehicle wheels and preventing sprays towards the outside.

13 Claims, 4 Drawing Sheets

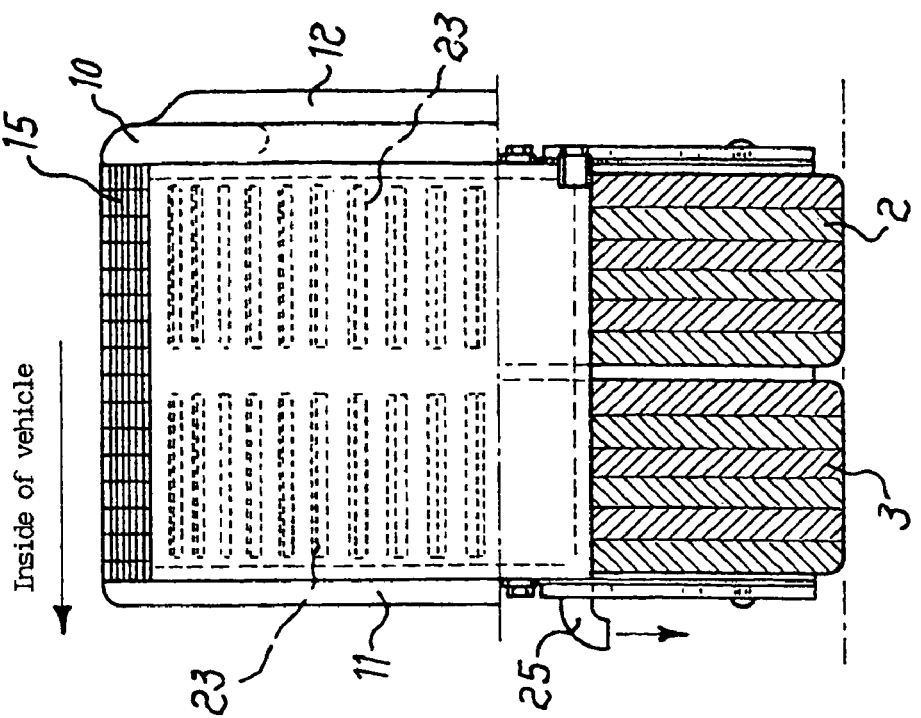
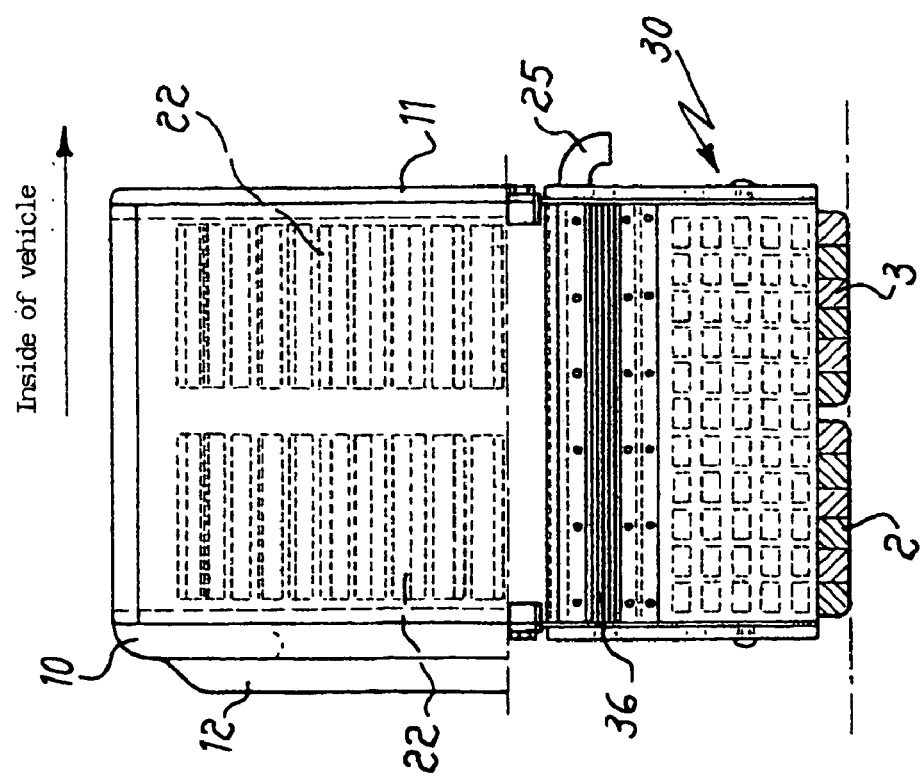

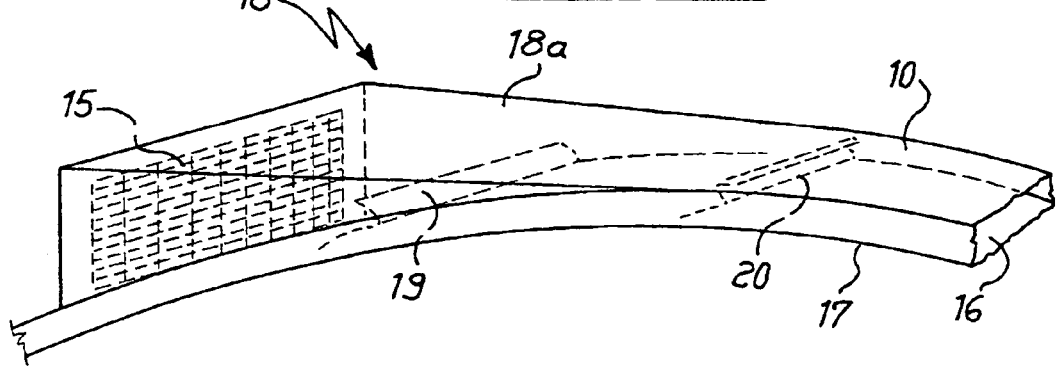
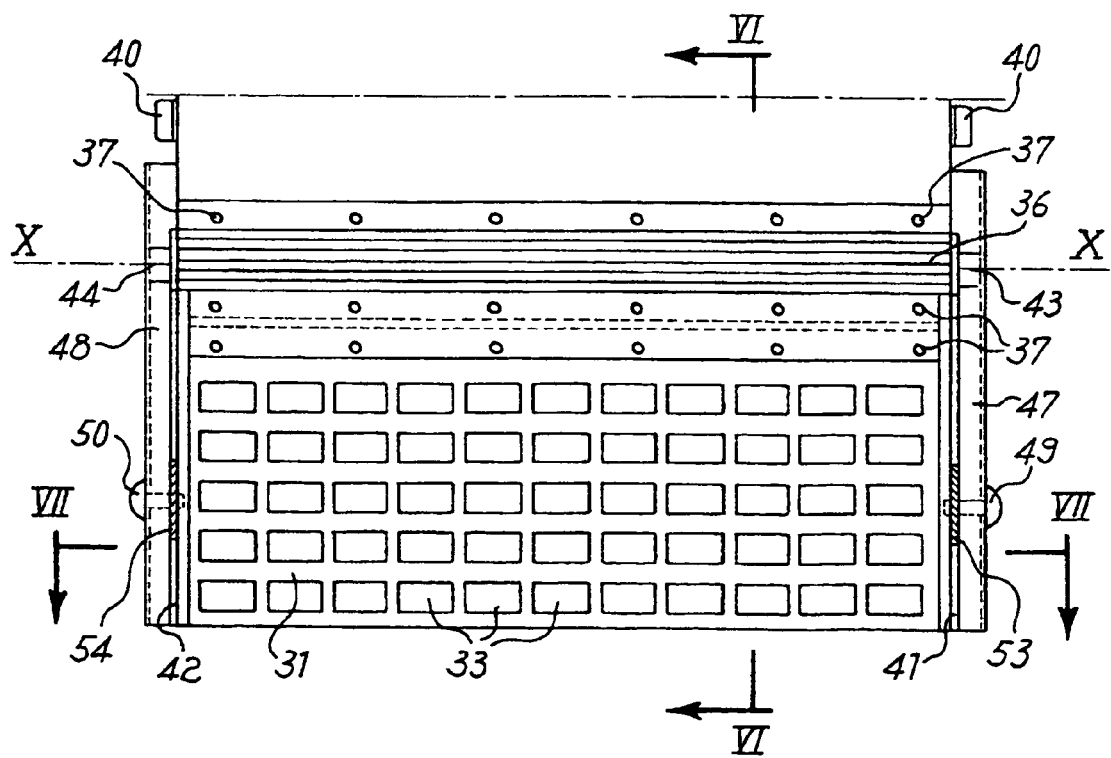

WATER-EXPELLING MUDGUARD FOR MOTOR VEHICLES

BACKGROUND AND SUMMARY OF THE INVENTION

The invention relates to a mudguard for vehicles in general, such as motor cars, lorries, trailers and the like.

In particular it relates to a hydro-expeller mudguard, i.e. a mudguard able to reduce water sprays and expel water drained from the wheel housing during travel of a vehicle.

In the remainder of this description reference will be made, for the sake of brevity, to the water and the phenomena which arise in connection with the travel of vehicles on wet roads: this, however, must not be understood as limiting the invention, which may also be applied with regard to the travel of vehicles on dry ground, since situations similar to those produced by water exist in the case of dust.

As is known, a situation which has important consequences for road safety is that caused by the water sprays of motor cars and lorries especially when travelling on wet roads.

In order to eliminate or in any case to reduce the negative effects arising from the mass of nebulized water created by the wheels of the vehicles, several kinds of mudguard have been proposed.

In simplified terms it may be stated that the known mudguards may be divided into two main categories: those where trapping of the spray is obtained by means of special surfaces applied inside the mudguard and those where the effects of air currents circulating inside the wheel housing are used, if necessary in combination with the abovementioned surfaces.

Examples of mudguards of the first type are described in European patent applications No. 528410 or No. 626308, while examples of the second type may be found in the international patent applications PCT/IB95/00071 or PCT/EP91/00461.

Basically, in the first case the trapping action is due to the fact that the water raised by the tyres is retained by the internal surface of the mudguard as a result of its configuration which prevents, or in any case limits, rebounding of the droplets sprayed against it.

For this purpose the mudguard is provided with a cavity whose surface facing the tyre is perforated or formed as a grill or in any other equivalent manner, so as to slow down and deviate the droplets towards the inside of the cavity wherefrom the water flows out because of gravity.

However, the efficiency of the mudguards made in accordance with this design depends also on the manner by which the water is evacuated from the cavity: therefore it follows that in the upper zone of the wheel housing where the inclination of the surfaces is small, there may be an accumulation or in any case poor drainage of the water, which limits the spray reducing effect of the entire system.

It is perhaps for this reason that such a solution seems to be adopted preferably in the rear zone of the known mudguards, which is rather inclined in the vertical direction.

In the other type of mudguards mentioned above, the water droplets are evacuated by making use of an air flow inside the wheel housing.

In particular, in the second international patent application indicated before there is disclosed a complex system for sucking the air and the water spray from such housing, based on the Venturi effect produced by special channels present in the vehicle or by fans.

It can be understood that such a solution requires modifications to the vehicle (and not only to the mudguard), thereby resulting difficult to be carried out on an industrial level and also expensive.

The present invention aims at overcoming the foregoing state of the art: namely, it has the object of providing a mudguard which reduces the water spray or the dust raised by motor-vehicle wheels, with such structural and operating features as to overcome the limitations of known mudguards.

This object is achieved by a hydro-expeller mudguard, whose characterising features are set out in the claims which will follow.

BRIEF DESCRIPTION OF THE DRAWINGS

The invention will be better understood in the light of the description provided hereinafter, relating to a preferred and non-exclusive embodiment thereof illustrated in the accompanying drawings wherein:

FIGS. 2 and 3 show the above mudguard respectively from the right-hand side and left-hand side, as indicated by the arrows D and S in FIG. 1;

FIG. 4 shows a perspective view of a part of the mudguard of FIGS. 1-3;

FIG. 5 shows in detail a particular feature of the above-mentioned mudguard;

DETAILED DESCRIPTION

As can be seen, the drawings show a hydro-expeller mudguard 1 in accordance with this invention applied to a pair of twin wheels 2, 3 of the type commonly used in lorries or trailers thereof.

Figure 1:
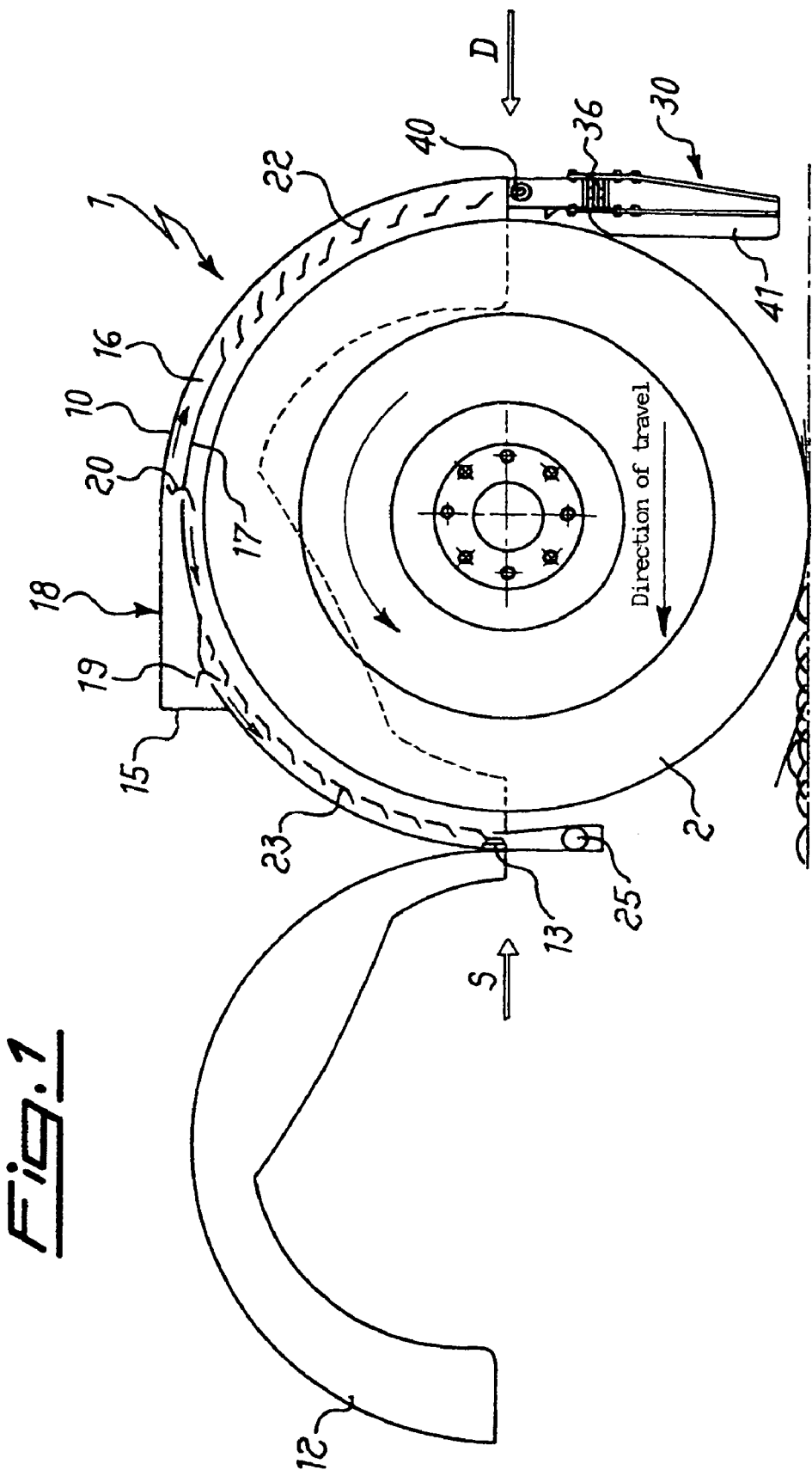
FIG. 1 is a front view of a mudguard according to the invention applied to the wheels of a vehicle.

The mudguard 1 comprises an external semi-circular body 10, fixed to the vehicle in a manner known per se and not shown in the drawings, which extends from the front side to the rear side of the wheels 2 and 3 with reference to the direction of travel indicated in FIG. 1.

The body 10 covers the wheels 2, 3 and includes a bottom surface 11 at the side directed towards the inside of the vehicle, while at the front it is closed by a cover 12 which may be opened in a manner similar to a hatch, being mounted with a hinge 13; in FIG. 1 this cover is shown with a continuous line in the open condition, while its profile is outlined (in the same figure) with broken lines in the closed condition.

An air inlet 15 which allows the entry of air from the outside towards the inside of the mudguard, is arranged on the top fore part of body 10.

In particular, a cavity 16 is defined inside the mudguard between the intrados 17 thereof and the external body, which communicates with the air inlet 15.

In accordance with this embodiment of the invention, the air which enters into the mudguard 1 through the inlet 15 passes through a converging manifold 18, where two deflectors 19 and 20 are located: the first of them is arranged upstream of the second one with reference to the direction of the relative speed of the air with respect to the mudguard, and deviates a part of the air flow towards the front sector of the mudgards, inside the cavity 16.

The deflector 20 which is located downstream divides, instead, the remainder of the incoming air flow into two parts: one part is deviated towards the space between the intrados 17 and the wheels 2, 3, while the other part flows out towards the rear zone of the cavity 16.

For this purpose the deflector 20, which consists of a metal plate folded with a concave profile likewise the first deflector, leaves the upper portion of the cross-section of the manifold 18 open so that the air can flow freely therethrough, towards the rear zone of the cavity 16.

In the rear and front sectors of the mudguard 1, fins 22 and 23 are also present.

As can be seen, these fins are formed differently depending on whether they are arranged on one sector or the other of the mudguard: this is in order to obtain a better retention effect of the water droplets sprayed by the wheels 2 and 3, along the whole of the semi-circular arch over which the mudguard extends.

The latter is provided, at the front, with a water collection channel 25 which terminates towards the inner side of the vehicle (FIGS. 2 and 3), and at the rear with a discharge chamber 30.

It should be noted that the fact that the collection channel 25 projects towards the inside of the vehicle beyond the wheel 3, prevents the water that flows out of it from falling into the rolling zone of the wheels with the consequent further formation of sprays and possible problems of grip on the road surface.

The discharge chamber 30 has not only the function of reducing the sprays, as the normal protective devices mounted in the same position on the known mudguards, but also that of retaining the sprays and draining the water flowing out of the cavity 16.

For this purpose the chamber 30 has a flattened box-shaped form tapered downwards, in which two planar walls 31 and 32, i.e. a front one and rear one, are located facing and converging one another.

Figure 7:
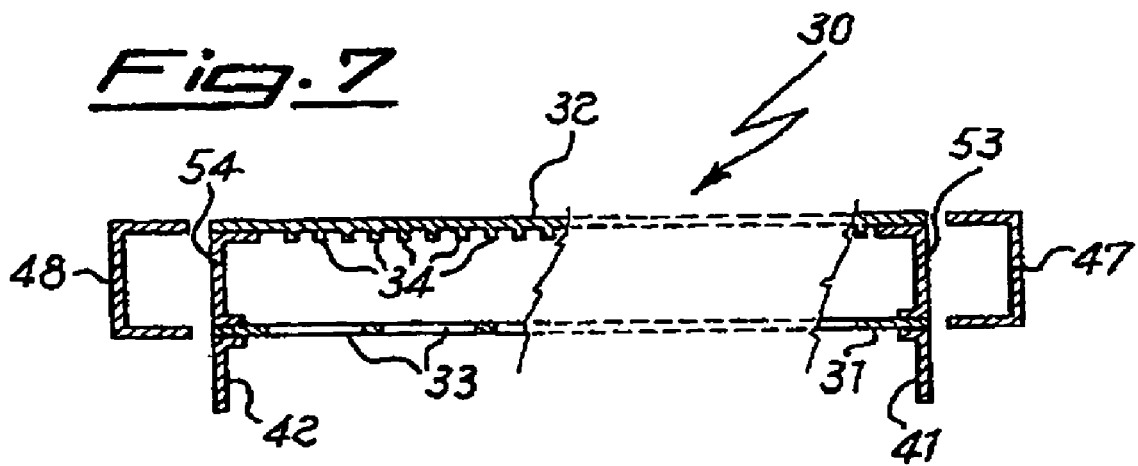

The front wall 31 is provided with holes 33 which, in this example, have a rectangular shape and are arranged in a matrix; the rear wall 32 is provided on its surface directed towards the inside of the chamber 30, with a series of vertical ribs 34 which define thin channels (see FIG. 7).

Advantageously, in this embodiment the chamber 30 comprises a resilient pleated band 36 which allows to absorb the accidental impacts with the ground during the travel of the vehicle, as will be described in more detail below.

This band is fixed at the top to the mudguard by means of rivets, bolts or similar systems indicated in the drawings by the reference number 37, while in accordance with a preferred embodiment, above the band there is located a slit 38 having a fin 39 associated thereto, which allows the water falling from above to be conveyed into the chamber 30; in order to check the condition of the mudguard and the presence of any obstructions preventing drainage of the water into the discharge chamber, inspection holes closed with plugs 40 have been provided above the latter.

The action of containing the spray in the vicinity of the road surface performed by the discharge chamber 30 is supplemented by two sidewalls 41 and 42 projecting frontally therefrom; in accordance with the invention it has been found that the spray reduction efficiency is improved by keeping the discharge chamber 30 in a substantially vertical position.

For this purpose, in this example of mudguard the following suspension system for the chamber has been provided.

As mentioned above, the resilient band ensures freedom of movement of the discharge chamber 30 in the vertical direction; it also makes the system flexible rotationally with respect to a horizontal axis X defined by a pair of pins 43 and 44 (cf FIG. 5), so as to be able to absorb better the impacts with the ground.

The aforementioned pins are rotationally supported on respective appendages 45, 46 of the body 10 of the mudguard and have fixed, at their projecting ends, guides 47, 48 which extend along the sides of the discharge chamber 30.

These guides are profiled sections with a C-shaped cross-section which accomodate, further to the pins 43 and 44, the studs 49 and 50 that engage in respective grooves 51 and 52 formed in the side walls 53, 54 of the discharge chamber 30 (in FIG. 5 the studs and grooves have been rendered visible by removing a portion of the concerned zone).

Figure 6:
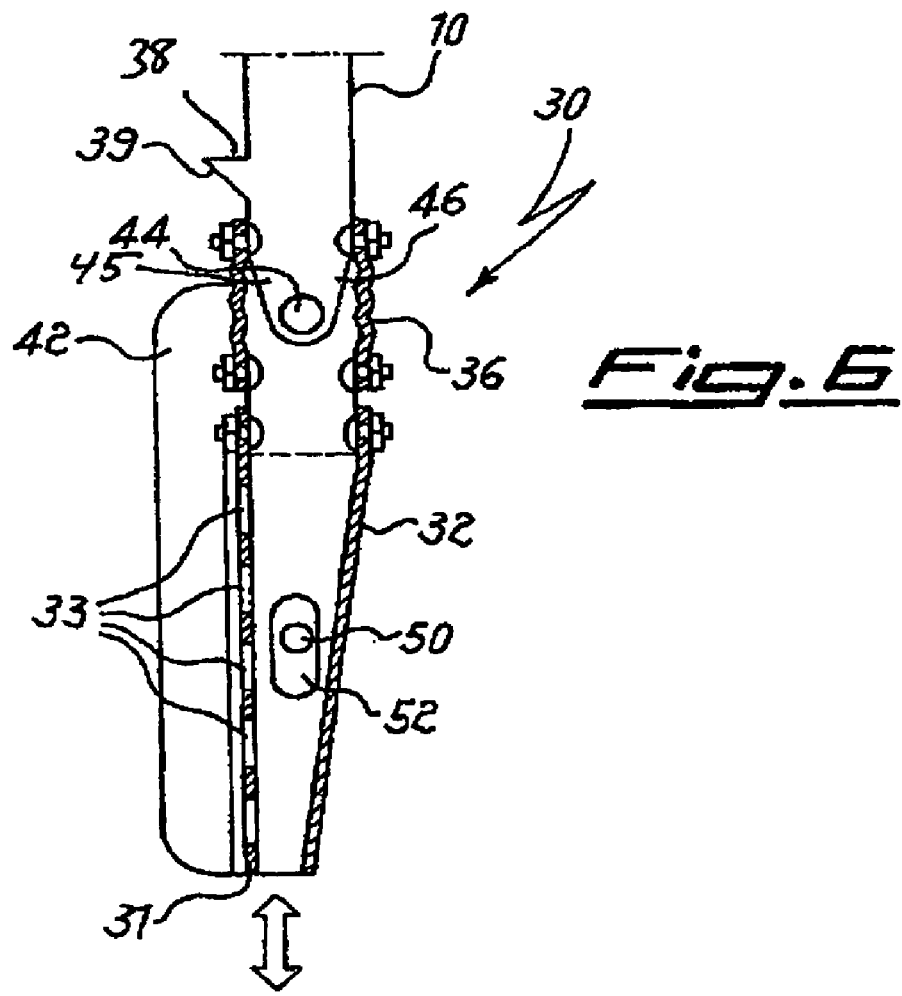
FIGS. 6, 7 are respective cross-sections along the lines VI-VI and VII-VII of FIG. 5.

In the case of impacts with the ground, owing to the flexibility of the pleated band 36, the chamber 30 may perform elastic movements from the bottom upwards and vice versa as indicated by the arrow in FIG. 6, guided by the engagement of the studs 49, 50 inside the grooves 53, 54.

Furthermore, the resilient band 36 allows the chamber 30 to perform also angular oscillations with respect to the axis X defined by the pins 43, 44: indeed, in the case of impacts which exert a thrust in a direction perpendicular to the chamber 30 (i.e. perpendicular to the plane of FIG. 5), the latter rotates elastically with respect to this axis with an angular amplitude which will depend on the entity of the thrust and on the elastic properties of the pleated band 30.

In other words, the latter may function like a spring which imparts either an elastic reactive force in vertical direction and an elastic return torque with respect to the axis X, so as to avoid that the chamber 30 be excessively stressed in the event of impacts.

It should be noted, however, that in the normal operating condition the chamber 30 is in any case kept vertical because this ensures better retention of the sprays.

In the light of what has been described hitherto it is possible to understand the mode of operation of the mudguard 1 according to the invention.

When the vehicle on which the mudguard is mounted is moving, the air which enters through the inlet 15 into the manifold 18 because of the speed, is deviated by the deflectors 19, 20 in two directions: the first one towards the front part of the mudguard, between the intrados 17 with the fins 23 and the body 10 as well as between the intrados and the wheels 2, 3, while the second towards the rear part of the cavity where the fins 22 extend.

It should be pointed out in this connection that the speed of the incoming air is accelerated following the Venturi effect provided by the converging shape of the manifold 18, defined between the intrados 17 and its horizontal ceiling 18a.

Meanwhile, the water raised by the wheels is sprayed partly towards the discharge chamber 30, partly towards the fins 22 of the rear sector of the mudguard 1 and partly towards the fins 23 of the front sector thereof.

The holes 33 present on the front of the discharge chamber 30 prevent the water droplets from rebounding off at high speed and producing spray: indeed, as a result of these holes the droplets can enter into the chamber 30 where they are retained against the rear wall 32 thereof, owing to the effect provided by the ribs 34.

At the same time, the water droplets sprayed against the rear sector of the mudguard are intercepted by the fins 22 and sucked into the cavity 16 by the air jet flowing inside it.

This suction effect is advantageously increased by the slight vacuum induced in the air while it flows along the converging manifold 18.

All the water which collects inside the cavity 16 flows thereafter downwards to the discharge chamber 30: the downwardly tapered shape of the latter and the presence of the thin channels formed by the ribs 34 on the rear wall thereof, ensure that water coming out makes a uniform veil similar to a barrier which helps to stop the spray raised by the wheels.

A similar situation also arises in the front sector of the mudguard: indeed, also in this case the water droplets transported into this zone by the wheels are sucked up by the air deviated by the deflectors 19 and 20 respectively into the space between the intrados 17 (with the fins 23) and the body 10, and into the space between the latter and the wheels 2, 3.

Unlike the rear sector, however, in this case the water which flows downwards is evacuated from the channel 25 on the inner side of the vehicle, thereby avoiding spray formation of towards the outside thereof.

From this explanation it can therefore be understood how the circulation of air inside the mudguard in accordance with the teaching of the present invention, allows optimum evacuation of the water spray produced by the wheels, preventing it also from stagnating in the top part where the surfaces have a small inclination and the water therefore cannot flow properly.

In addition to this result, which is important per se, it must be added that the conveying of the air so obtained reduces the turbulence between the mudguard and the wheels, which may cause the formation of water spray towards the outside of the vehicle.

It should be noted in this connection that the front cover 12 performs a useful function in that it protects the mudguard (and the air flow inside it) from interference, due to turbulent external air flows resulting from the speed of the vehicle.

Obviously variations of the invention with respect to its embodiment illustrated hereinbefore are possible.

By way of example, there could be provided on the bottom wall or on the front cover 12 drainage channels such as those shown in broken lines in FIGS. 2 and 3 intended to collect the water sprayed against it.

Furthermore, also as regards the manner in which the air is conveyed towards the front and rear sectors of the mudguard, several solutions are possible.

For example it should be considered that in the case when air passing in the space between the intrados and the wheels is not required, the deflector 20 could be eliminated and the air could still flow in the rear part of the cavity 16.

Moreover, there could also be provided a number of deflectors along the manifold 18 greater than two as disclosed in the above example, in order to improve or in any case increase the air flow circulating inside the mudguard; such a solution would be useful in the case of large-size applications, like for lorries and similar vehicles.

In the same way it could be envisaged to provide several manifolds for conveying air into the front and rear sectors of the mudguard, instead of the single one seen in the aforesaid embodiment.

For example, it would be possible to provide a mudguard in which the deflectors 19, 20 and the single manifold 18, are replaced by a plurality of manifolds connected to the cavity 16 at the same point as the deflectors and/or other points, so as to convey the air in accordance with the teaching explained heretofore.

These and further variations nevertheless fall within the scope of the following claims.

The invention claimed is:

1. A mudguard for vehicles in general, comprising an external body and an intrados between which a curved cavity extending from a front sector to a rear sector of the mudguard is defined with reference to a vehicle wheel, wherein the mudguard comprises at least one inlet for entry of air into the cavity and means associated thereto for conveying air into both front and rear sectors,
said air conveying means comprising a manifold extending substantially tangentially with respect to the cavity from the highest point thereof, and at least one deflector arranged along this manifold, the deflector being concave with the concavity facing said air inlet for deviating a portion of the air flow entering said at least one inlet towards the front sector of the cavity, and wherein the intrados further comprises fins disposed in the front and rear sectors.

2. The mudguard of claim 1, further comprising means for conveying air between the front part of a wheel and the intrados.

3. The mudguard of claim 1, wherein the manifold has a shape converging from the air inlet towards the cavity.

4. The mudguard of claim 1, wherein the deflector deviates a part of the air flow entering via the inlet towards the space between the front part of the wheel and the intrados of the mudguard.

5. The mudguard of claim 1, wherein said air conveying means further comprises a plurality of manifolds extending substantially transverse or tangential with respect to the cavity and connected to it at different points, so as to convey air along the front and rear sectors of the mudguard.

6. The mudguard of claim 1, further comprising a front protective cover hinged to the body and/or to the intrados.

7. The mudguard of claim 1, further comprising a discharge chamber located at the end of the rear sector and having a flattened box shape tapered downwards with two flat walls, a front wall and a rear wall, arranged facing one another in a converging manner, in which the front wall is provided with a plurality of holes.

8. The mudguard of claim 7, wherein the rear wall of the discharge chamber is provided with ribs arranged side by side which define channels for draining the water downwards.

9. The mudguard of claim 7, wherein the discharge chamber is connected to the rear sector of the mudguard by means of a resilient band so as to be movable from the bottom upwards and vice versa.

10. The mudguard of claim 9, wherein the discharge chamber is supported by pins so as to swing angularly with respect to a substantially horizontal axis.

11. The mudguard of claim 9, wherein the resilient band is of pleated type.

12. The mudguard of claim 7, further comprising means for guiding the movements, from the bottom upwards and vice versa, of the discharge chamber.

13. The mudguard of claim 12, wherein said guiding means comprise sections arranged on the side of the discharge chamber and studs fixed to the sections, which engage in grooves arranged on the sides of the discharge chamber.

* * * * *